(12) United States Patent
Bollinger (10) Patent No.: US 8,799,193 B2
(45) Date of Patent: Aug. 5, 2014

(54) METHOD FOR TRAINING AND USING A CLASSIFICATION MODEL WITH ASSOCIATION RULE MODELS

(75) Inventor: Toni Bollinger, Weil der Stadt (DE)

(73) Assignee: International Business Machines Corporation, Armonk, NY (US)

(*) Notice: Subject to any disclaimer, the term of this patent is extended or adjusted under 35 U.S.C. 154(b) by 233 days.

(21) Appl. No.: 13/514,044

(22) PCT Filed: Dec. 7, 2010

(86) PCT No.: PCT/EP2010/069084
§ 371 (c)(1),
(2), (4) Date: Jun. 5, 2012

(87) PCT Pub. No.: WO2011/076560
PCT Pub. Date: Jun. 30, 2011

(65) Prior Publication Data
US 2012/0239600 A1 Sep. 20, 2012

(30) Foreign Application Priority Data

Dec. 21, 2009 (EP) ..................................... 09180083

(51) Int. Cl.
*G06N 5/02* (2006.01)
*G06N 99/00* (2010.01)
*G06F 17/30* (2006.01)

(52) U.S. Cl.
CPC .............. *G06N 5/025* (2013.01); *G06N 99/005* (2013.01); *G06F 17/30598* (2013.01)
USPC ............................................. 706/12; 706/45

(58) Field of Classification Search
None
See application file for complete search history.

(56) References Cited

U.S. PATENT DOCUMENTS

| | | | |
|---|---|---|---|
| 5,974,396 | A | 10/1999 | Anderson et al. |
| 6,563,952 | B1 | 5/2003 | Srivastava et al. |
| 7,328,169 | B2 | 2/2008 | Temares et al. |
| 7,433,879 | B1 | 10/2008 | Sharma et al. |
| 7,509,337 | B2 | 3/2009 | Chitgupakar et al. |
| 7,516,152 | B2 | 4/2009 | Chitgupakar et al. |
| 7,567,918 | B2 | 7/2009 | Manganaris et al. |

(Continued)

OTHER PUBLICATIONS

Vazirgiannis et al., Chapter 3: Quality Assessment in Data Mining, Uncertainty Handling and Quality Assessment in Data Mining, Springer-Verlag, London, 2003, pp. 73-127.*

(Continued)

*Primary Examiner* — Wilbert L Starks
(74) *Attorney, Agent, or Firm* — Janaki K. Davda; Konrad, Raynes, Davda and Victor LLP (57) ABSTRACT

A classification model is trained and used for detecting patterns in input data. The training of the model includes retrieving a set of previously recorded input data containing a plurality of items associated with a plurality of entities and adding to each entity a known classification. Furthermore, training the model includes determining rules from the set of previously recorded input data and the known classification by associating the classification of each entity with the respective items of said entity. The training of the model further includes determining a set of rules which are applicable, aggregating the lift values of the rules determined for said entity, and predicting a classification based on the aggregated association values for each entity. The resulting aggregated lift value together with the respective entity and classification are used as input for a standard classification algorithm, where the result is a classification model.

18 Claims, 3 Drawing Sheets

(56) References Cited

U.S. PATENT DOCUMENTS

| | | |
|---|---|---|
| 2007/0043615 A1 | 2/2007 | Dahleh et al. |
| 2008/0147485 A1 | 6/2008 | Osagami et al. |
| 2008/0306820 A1 | 12/2008 | Passmore |

OTHER PUBLICATIONS

PCT International Preliminary Report, Jul. 5, 2012, for Application No. PCT/EP2010/069084, Total 12 pp.

Baragoin, C., C.M. Anderson, S. Bayerl, G. Bent, J. Lee, and C. Schommer, "Mining Your Own Business in Retail Using DB2 Intelligent Miner for Data", IBM Redbook, Aug. 2001, [online] retrieved from the Internet at URL: http://publib-b.boulder.ibm.com/Redbooks.nsf/RedbookAbstracts/sg246271.html?Open>, 214 pp.

Barthelemy, J.P., A. Legrain, P. Lenca, and B. Vaillant, "Aggregation of Valued Relations Applied to Association Rule Interestingness Measures", Proceedings of the Third International Conference on Modeling Decisions for Artificial Intelligence, 2006, 12 pp.

Bertsimas, D.J., A.J. Mersereau, and N.R. Patel, "Dynamic Classification of Online Customers", Proceedings of the 2003 SIAM International Conference on Data Mining, [online] 2003, Retrieved from the Internet at <URL: http://public.kenan-flagler.unc.edu/faculty/merserea/papers/bertsimas_mersereau_patel_siam.pdf>, 12 pp.

Bouzouita, I. and S. Elloumi et al., "Efficient Generic Association Rules Based Classifier Approach", Proceedings of the 4th International Conference on Concept Lattices and Their Applications, 2008, 16 pp.

Bouzouita, I. and S. Elloumi, "Integrated Generic Association Rule Based Classifier", Proceedings of the 18th International Workshop on Database and Expert Systems Applications, 2007, 6 pp.

Boztug, Y. and T. Reutterer, "A Combined Approach for Segment-Specific Market Basket Analysis", European Journal of Operational Research, 187, [online] 2007, Retrieved from the Internet at <URL: http://www.sciencedirect.com/science?_ob=ArticleURL&_udi=B6VCT-4ND60KK-3&_user=10&_rdoc=1&_fmt=&_orig=search&_sort=d&_docanchor=&view=c&_searchStrId=1086408579&_rerunOrigin=scholar.google&_acct=C000050221&_version=1&_urlVersion=0&_userid=10&md5=0fb512837547685f8f1d455354466f7c>, 19 pp.

Brijs, T., G. Swinnen, K. Vanhoof, and G. Wets, "Using Association Rules for Product Assortment Decisions in Automated Convenience Stores", 1999, retrieved from the Internet at <URL: http://citeseerx.ist.psu.edu/viewdoc/download?doi=10.1.1.27.6757&rep=rep1&type=pdf>, 17 pp.

International Search Report and Written Opinion for International Application No. PCT/EP2010/069084, dated Feb. 3, 2011, 15 pp. [54.88PCT (ISR & WO)].

Jorge, A.M., and P.J. Azevedo, "An Experiment with Association Rules and Classification: Post-Bagging and Conviction", Proceedings of the 8th International Conference on Discovery Science, Lecture Notes in Computer Science, 3735, 2005, 14 pp.

Mutter, S., "Classification Using Association Rules", Thesis Paper, University of Freiberg, [online] Mar. 11, 2004, retrieved from <URL: http://citeseerx.ist.psu.edu/viewdoc/download?doi=10.1.1.132.8785&rep=rep1&type=pdf>, 123 pp.

Ng, K., and H. Lu, "Customer Retention via Data Mining", Artificial Intelligence Review 14, [online] 2000, Retrieved from the Internet at <URL: http://www.springerlink.com/content/j3835671r2412811/>, 22 pp.

Shaw, M.J., C. Subramaniam, G.W. Tan, and M.E. Welge, "Knowledge Management and Data Mining for Marketing", Decision Support Systems 31, [online] 2001, Retrieved from the Internet at <URL: http://www.sciencedirect.com/science?_ob=ArticleURL&_udi=B6V8S-42M1DPP-9&_user=10&_rdoc=1&_fmt=&_orig=search&_sort=d&_docanchor=&view=c&_searchStrId=1085556543&_rerunOrigin=scholar.google&_acct=C000050221&_version=1&_urlVersion=0&_userid=10&md5=7bf4dc4fce48ba7b94b89f7b13e2cad1>, 11 pp.

Sheikh, L.M., B. Tanveer, and S.M.A. Hamdani, "Interesting Measures for Mining Association Rules", Proceedings of the INMIC 2004 8th International Multitopic Conference, 2004, 4 pp.

* cited by examiner

METHOD FOR TRAINING AND USING A CLASSIFICATION MODEL WITH ASSOCIATION RULE MODELS

BACKGROUND

Data mining refers in general to data-driven approaches for extracting information from input data. Other approaches for extracting information from input data are typically hypothesis driven, where a set of hypotheses is proven true or false in view of the input data.

The amount of input data may be huge, and therefore data mining techniques typically need to consider how to effectively process large amounts of data. Consider manufacturing of products as an example. There, the input data may include various pieces of data relating to origin and features of components, processing of the components in a manufacturing plant, how the components have been assembled together. The aim of data mining in the context of manufacturing may be to resolve problems relating to quality analysis and quality assurance. Data mining may be used, for example, for root cause analysis, for early warning systems within the manufacture plant, and for reducing warranty claims. As a second example, consider various information technology systems. There, data mining may further be used for intrusion detection, system monitoring and problem analyses. Data mining has also various other uses, for example, in retail and services, where typical customer behaviour can be analysed, and in medicine and life sciences for finding causal relations in clinical studies.

Pattern detection is a data mining discipline. The input data can consist of sets of transactions where each transaction contains a set of items. The transactions may additionally be ordered. The ordering may be based on time, but alternatively any ordering can be defined. For example, each transaction may have been given a sequence number. For transactional data, association rules are patterns describing how items occur within transactions.

Consider a set of items $I=\{I_1, I_2, \ldots Im\}$. Let D be a set of transactions, where each transaction T is a set of items belonging to I. A transaction T thus contains a set A of items in I if $A \subset T$. An association rule is an implication of the form $A \Rightarrow B$, where $A \subset I$, $B \subset I$, and $A \cap B = \emptyset$; A is called the body and B the head of the rule. The association rule $A \Rightarrow B$ holds true in the transaction set D with a confidence c, if c % of the transactions in D that contain A also contain B. In other words, the confidence c is the conditional probability p(B|A), where p(S) is the probability of finding S as a subset of a transaction T in D. The rule $A \Rightarrow B$ has support s in the transaction set D, when s % of the transactions in D contain $A \cup B$. In other words, the support s is the probability of the union of items in set A and in set B occurring in a transaction. The lift of a rule is the quotient of the rule confidence and the expected confidence. The expected confidence of a rule is the confidence under the assumption that the occurrences of the rule head and rule body items in the transactions are statistically independent of each other. It is equal to the support of the rule head and expresses the degree of "attraction" between the items in the rule body and head. A lift value greater than 1 means that the items attract each other, whereas a value less than 1 is an indicator for repulsion.

The aim in association rule mining is to accurately find all rules meeting user defined criteria. The user may define a minimum support or confidence for the rules, as very rare or loosely correlated events may not be of importance for some applications. The user may also be interested only in particular items and wants to search only for patterns containing at least one of these interesting items.

The known data mining algorithms have drawbacks in certain situations. Depending on the amount of input data, in some circumstances up to hundreds of millions until billions of records, and on the size of the candidate pattern space, the breadth-first search may be slow since many scans on the original data source are needed and since each candidate pattern needs to be evaluated against all transactions. The depth-first search, on the other hand, may run out of memory for large amounts of input data, or—because of the large number of evaluations against the input data—it may be slow when the input data is swapped to the disk. Additionally, these data mining algorithms are based on item hierarchy. Since such item hierarchy is seldom available, it has to be determined first. Such determinations may be flawed and can therefore discredit the results of the algorithm.

Finding a classification model for predicting categorical "classification" values is another important data mining problem. Examples for this include predicting if a customer will move to a competitor, e.g. "churn prediction", if a customer would respond to a marketing campaign, if a product like a car will be delivered on time, too late or too early or if a product like a computer chip is faulty. For building such a model one starts with historical data, i.e., cases with known classification values, for instance the churn and non-churn cases of the last 12 months, the results of a test marketing campaign or production data with delivery time values. These historical data can be collected in a data table containing one row for each entity, like customer or product, and having one column for the classification values and columns for other characteristics of the entities.

The task of a classification algorithm is to derive from the values of these others columns, e.g. the "independent variables", the classification value, e.g. the value of the "dependent variable", which is often called the training of a classification model. For churn prediction and for predicting if a customer responds to a marketing campaign the historical data may include, besides demographic data about a customer, like age, marital status or domicile, information about his or her behavior as a client. For predicting product delivery delays information about the products can be included, like specific features, and details about the production process.

Once such a classification model has been trained and its quality is good enough, which can be determined by using a subset of the historical data that has not been used for training the model, it can be used for predicting future cases. For these data only the values of the independent variables are known, but not those of the class label. The "predicted" values are determined by applying the classification model to these data. This step is called as well the "scoring" of a model. For churn prediction one determines in this way the customers who are likely to churn in the near future, for a marketing campaign ones determines the potential responders and for product delivery one determines the better estimate for the delivery date.

Most classification algorithms require that the input table for training a model contains one row per entity. However, available data tables with historic information may contain more than one row per entity, which makes it necessary to pre-process and transform the input data to fulfill this requirement.

This is the case when a part of the information about the entities is included in transactions. Tables with transactions have at least 2 columns, one for the id of the entity and an "item" column with categorical values. For sales transaction data containing the information which articles have been purchased by which customers the customer id would correspond to the entity id and the item column would contain the ids of the purchased articles. Such a table may contain additional columns with useful information. For sales transaction data this can be the purchase date or the price and the quantity of the articles. The customer to classification value mapping may be defined in a separate table. Additional information besides those included the transactions, like demographic information for customers or specific features for products, may be available as well. As this, however, is not relevant for this invention, one assumes that only a set of transactions and the entity to classification value is available.

One approach to solve this problem is to create a new table from the transactions table which contains a column for the entity id and one column for each possible categorical value of the item column. For a given entity and a categorical value the value of the corresponding column may be 1 if the transactional data contains such a record and 0 if this is not the case. For such a table the number of columns will be 1+number of distinct categorical values of the item column. This approach works well for a low number of distinct categorical values. However, for domains like manufacturing with hundreds of possible product features and production steps or retail with even thousands of different items sold in a supermarket this approach becomes inefficient if not unfeasible.

In this situation a hierarchy respectively taxonomy over the categorical values of the item column can help by creating columns only for higher concepts in the taxonomy. The value of the corresponding column for an entity can be the number of associated categorical values in the item column which belong to that higher concept.

However, if such a hierarchy is missing or the hierarchy does not reflect the appropriate partitioning with respect to the classification problem, the result will be a classification model of a poor quality. The latter may happen, for instance, if quality problems are caused by specific combinations of features that belong to different categories. If may happen as well, if a marketing campaign promotes organic food products, the product hierarchy does not reflect this characterization of the products.

There is thus a need for an efficient method for determining patterns in input data that overcomes at least some of the problems mentioned above in connection with known data mining techniques. In particular, there exists a need for a classification model free of item hierarchy which is able to handle standard classification models. In addition, the new model should be more efficient in terms of processing speed, in terms of memory consumption and in terms of necessary computing resources.

SUMMARY

It is an object of the invention to propose a new method that addresses the above mentioned problems associated with solving a classification data mining problem.

This object is achieved by the independent claims. Advantageous embodiments are detailed in the dependent claims.

In accordance with the present invention, there is provided a method for training a classification model for detecting patterns in input data containing a plurality of items associated with a plurality of entities. The method comprises retrieving a set of previously recorded input data containing a plurality of items associated with a plurality of entities and adding to each entity a known classification of the entity. Furthermore, the method comprises determining rules from the set of previously recorded input data and the known classification by associating the classification of each entity with the respective items of said entity. The method then determines rules from the set of previously recorded input data and the known classification, where rules associate the classification of each entity with the respective items of said entity and each rule comprises a set of attributes.

Previously recorded data is used for training the method. Training the method comprises generating a set of rules. The previously recorded data relates to a number of entities, a number for items corresponding to the entities and a classification of the entity. It should be noted that the same item may correspond to two separate entities. The rules are created by associating the recorded outcome or classification of the entity with the recorded items of the entity. One or more items are saved in the rule body, while the classification is saved in the rule head. As was stated before, one item may correspond to different entities and therefore also to different classifications. Hence it is possible two have one rule linking a certain item to one classification, while in another rule, the same item may be linked to a different classification. If this is the case, then there is a need to distinguish between the strengths of the rules. This is done by the attributes of the rules. The attributes include a lift value between the rule body and the rule head. Furthermore, the attributes may comprise a support value and a confidence value. The support value corresponds to the percentage of entities, in which the item of the rule body was supported by the classification of the rule head. The confidence value corresponds to the confidence of the item with the classification.

In accordance with the present invention, the training of the model further comprises determining for each entity which rules are applicable and aggregating, for each entity, the lift values of the rules determined for said entity. The resulting aggregated lift value together with information on the respective entity and classification are used as input for a standard classification algorithm. The end result is a classification model.

In accordance with the present invention, there is provided the use of association rules data mining model for detecting patterns in input data containing a plurality of items associated with a plurality of entities. Using the trained model on new data comprises the step of checking, for each entity, a set of rules to determine which rule is applicable. Furthermore, the method comprises the steps of aggregating, for each entity, the lift values of the rules determined for said entity and predicting, for each entity, a classification based on the aggregated lift values for each entity and the classification model. The rules applicable for each entity and having a same classification in the rule head may be grouped together. The lift values of rules within a group may be multiplied with each other.

With the present invention it is possible to tailor the data mining approach towards a specific classification problem. For each specification problem that might arise a certain set of rules can be determined. Allowing the rules to be selectable enables the model to be adjustable to the given circumstances. Combining different rules from the rules sets enables a large degree of fine tuning of the model. A certain combination of rules may be particularly suitable for a certain specification, while a different combination may not be. Furthermore, the rules may also be combined with respect to the specific entity at hand. Once again, the vast number for different rule combinations allow for a very sensitive fine tuning of the model to optimally address both the classification problem as well as the entity at hand.

Using the association rules model in this way renders the otherwise necessary hierarchy on the items of the transactions obsolete. By using the model with rules trained at the item level, this data mining approach can be more efficient in terms of speed, required computing resources and memory consumption compared to the state of the art documents, in particular when no hierarchy is available. Because of the simplicity of use, the present model can easily handle the hundreds of millions or even billions of records. Furthermore, the quality of the classification results can be better.

In accordance with another aspect of the present invention, the step of determining the set of applicable rules further comprises checking the items of the entity and determining the rules in the rule set with said items in the rule body.

In accordance with yet an another aspect of the present invention, the step of aggregating the rules further comprises grouping the determined rules with the same classifications in the rule head and multiplying with each other the lift values of the rules with the same head.

For a certain entity of the fresh data set all the applicable rules were determined. In this preferred embodiment, the applicable rules are now grouped depending on the classifications in the rule heads. The rules with the same classifications are grouped together. Multiplying the lift values of each group gives an indication of classification of the entity. The classification of the group with the highest aggregated lift value is the most likely classification for the entity.

In accordance with yet an another aspect of the present invention, the step of grouping the determined rules further comprises grouping only those rules, whose lift values are above a predetermined threshold.

Grouping only those rules whose associated values are above a predetermined threshold allows for further fine tuning of the method with regard to the specific classification problem at hand. One of the ways to fine tune the method would be to only use the rules with a relatively high lift value to a class. The resulting product of the lift values would give a further insight into the likelihood of a certain classification of the tested entity.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE SEVERAL VIEWS OF THE DRAWINGS

Preferred embodiments of the invention are illustrated in the accompanied figures. These embodiments are merely exemplary, i.e. they are not intended to limit the content and scope of the appended claims.

DETAILED DESCRIPTION

Figure 1:
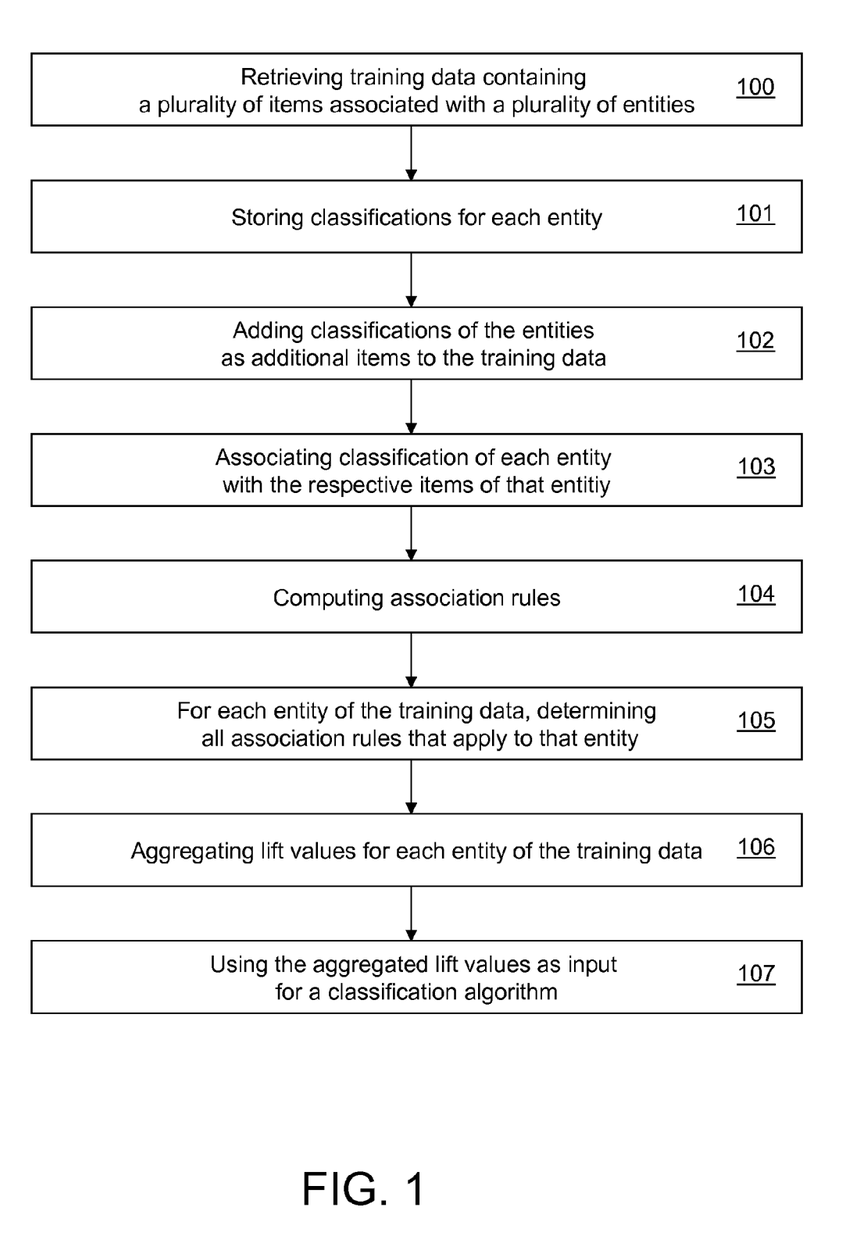
FIG. 1 shows a flow chart of training the claimed model.

Displayed in FIG. 1 is a flow chart depicting the training of the claimed method. Step 100 of the flow chart comprises gathering the training data. The training data represents a set of entities, each entity being associated with a set of items. The training data typically comprises a set of data entries, each data entry containing an entity identifier and one item identifier. In addition, the training data comprises a classification of the entities. Depending on the field of application, the terms entity, item and classification may refer to different information. For customer classification, the entity is the customer and the items are the items in the customers shopping basket. For a manufacturing process the classification may be used to detect production faults. In that respect, the entity would be the product id and the items may be the discretized temperature during production, the humidity, the supplier of raw material etc. Other application may be for telco customers, where their call records may be stored. The method may also be applied to a word list of call center records where the items may be certain words used by the call center agent during a conversation with a customer.

As an example, the field of application may be at a manufacturing line for computer chips. Consider the problem of determining the possible cause of malfunctioning output from a computer chip production line. During the manufacturing process, a large number of parameters are measured. These parameters may include the temperature, the number of dust particles per $m^3$ and the name of the company that delivered the semiconductor material. In a subsequent test of the produced chips, it is measured if there are any logical errors in the chip.

In this particular example, each chip is an entity in the data set. The items in the data set of each entity are the parameters such as temperature, the number of dust particles per $m^3$ and the name of the company that delivered the semiconductor material for each chip. The classification reflects the outcomes of the tests on each produced chip. Two exemplary classifications are "logical errors" and "no logical errors".

In step 100, the training data is retrieved. The training data may be stored in a table such as following. The training data table typically comprises an entity column and an item column. In this particular example, the entity column of the table is the chip-ids. For simplified reasons they are named chip_1 to chip_5. In the second column are the items. In this case they are production parameters for the production of the chips and may include features of the chips as well. For simplicity reasons, only three parameters are shown.

TABLE 1

| Entity/Chip-ID | Item/Parameter |
|---|---|
| Chip_1 | X ° C. |
| Chip_1 | Y $ppm^3$ |
| Chip_1 | company A |
| Chip_2 | X ° C. |
| Chip_2 | Y $ppm^3$ |
| Chip_2 | company B |
| Chip_3 | X ° C. |
| Chip_3 | Z $ppm^3$ |
| Chip_3 | company C |
| Chip_4 | X ° C. |
| Chip_4 | Y $ppm^3$ |
| Chip_4 | company A |
| Chip_5 | Y ° C. |
| Chip_5 | Y $ppm^3$ |
| Chip_5 | company D |

In step 101, the known classifications for each entity are stored in another data table.

TABLE 2

| Entity/Chip-ID | Category/Classification |
|---|---|
| Chip_1 | NLE (no logical errors) |
| Chip_2 | NLE |
| Chip_3 | LE (logical errors) |
| Chip_4 | NLE |
| Chip_5 | LE |

For our example, the known classifications are stored in Table 2. The classification is either NLE for no logical errors of LE for logical errors. Therefore, with the information in Table 1 and 2, one knows that chip_1 was produced at a temperature of X° C., with Y $ppm^3$ dust particles and using the raw material of company A; the subsequent test of the chip showed no logical errors.

In step 102 of the FIG. 1, the classifications of the entities contained in the table of step 101 are added as additional items to the transactional training data of step 100. This can be done by computing the union of the tables of step 100 and 101. The two column format of the resulting table is the most widely used for the application of the associations algorithm. The resulting table for our example can be seen below.

TABLE 3

| Entity/Chip-ID | item/Parameter |
|---|---|
| Chip_1 | X ° C. |
| Chip_1 | Y $ppm^3$ |
| Chip_1 | company A |
| Chip_1 | NLE |
| Chip_2 | X ° C. |
| Chip_2 | Y $ppm^3$ |
| Chip_2 | company B |
| Chip_2 | NLE |
| Chip_3 | X ° C. |
| Chip_3 | Z $ppm^3$ |
| Chip_3 | company C |
| Chip_3 | LE |
| Chip_4 | X ° C. |
| Chip_4 | Y $ppm^3$ |
| Chip_4 | company A |
| Chip_4 | NLE |
| Chip_5 | Y ° C. |
| Chip_5 | Y $ppm^3$ |
| Chip_5 | company D |
| Chip_5 | LE |

Step 103 of FIG. 1, the classification of each entity is associated with the respective items of that entity. It is to be stated that the step 103 is optional. In this case, each of the parameters in table 3 belonging to the entity chip_1, are associated with the classification of chip_1, being no logical errors (NLE). Therefore, for chip_1, the temperature X° C. is associated with NLE. Likewise, the value of Y ppm is also associated with NLE.

In Step 104 of FIG. 1, the association rules are computed. Each rule comprises a head and a body. The classification of the entities is in the head of the rule, while the (original) items are in the body of the rule. Furthermore, additional attributes of the rules are of interest and therefore determined in order to gauge their statistical importance of each rule. These properties are lift, confidence and support of each rule.

The support of a rule (a=>b) equates to the number of transactions a∪b divided by the total number of transactions.

The confidence of a rule (a=>b) equates to the number of transactions a∪b divided by the number of transactions with (a) as the rule body.

The lift of a rule (a=>b) equals the confidence of the rule (a=>b) divided by the expected confidence of the rule (a=>b). The expected confidence of a rule is the confidence under the assumption that the occurrences of the items in the rule body, in this case "a", and the rule head, here "b", in the transactions are statistically independent of each other.

In this particular example, the following table is a result of the steps 103 and 104.

TABLE 4

| Rule | Body | Head | Lift | Confidence | Support |
|---|---|---|---|---|---|
| X ° C.=>NLE | X ° C. | NLE | 1.25 | 75.00% | 60.00% |
| Y ppm$^3$=>NLE | Y ppm$^3$ | NLE | 1.25 | 75.00% | 60.00% |
| companyA=>NLE | companyA | NLE | 1.67 | 100.00% | 40.00% |
| companyB=>NLE | companyB | NLE | 1.67 | 100.00% | 20.00% |
| X ° C.=>LE | X ° C. | LE | 0.63 | 25.00% | 20.00% |
| Z ppm$^3$=>NLE | Z ppm$^3$ | LE | 2.50 | 100.00% | 20.00% |
| companyC=>LE | companyC | LE | 2.50 | 100.00% | 20.00% |
| Y ° C.=>LE | Y ° C. | LE | 2.50 | 100.00% | 20.00% |

TABLE 4-continued

| Rule | Body | Head | Lift | Confidence | Support |
|---|---|---|---|---|---|
| Y ppm$^3$=>LE | Y ppm$^3$ | LE | 0.63 | 25.00% | 20.00% |
| companyD=>LE | companyD | LE | 2.50 | 100.00% | 20.00% |

In step 105 of FIG. 1, all the rules that are applicable for each entity of the training model are determined. The result is the following table 5. For simplicity reason, this is only done for the chip_1 and chip_2. During the training of the model, this step is done for all the training data.

TABLE 5

| Chip_id | Body | Head | Rule | lift |
|---|---|---|---|---|
| Chip_1 | X ° C. | NLE | X ° C.=>NLE | 1.25 |
| Chip_1 | X ° C. | LE | X ° C.=>LE | 0.63 |

TABLE 5-continued

| Chip_id | Body | Head | Rule | lift |
|---|---|---|---|---|
| Chip_1 | Y ppm$^3$ | NLE | Y ppm$^3$=>NLE | 1.25 |
| Chip_1 | Y ppm$^3$ | LE | Y ppm$^3$=>LE | 0.63 |
| Chip_1 | company A | NLE | companyA=>NLE | 1.67 |
| Chip_2 | X ° C. | NLE | X ° C.=>NLE | 1.25 |
| Chip_2 | X ° C. | LE | X ° C.=>LE | 0.63 |
| Chip_2 | Y ppm$^3$ | NLE | Y ppm$^3$=>NLE | 1.25 |
| Chip_2 | Y ppm$^3$ | LE | Y ppm$^3$=>LE | 0.63 |
| Chip_2 | company B | NLE | companyB=>NLE | 1.67 |

Next the lift values are aggregated for each entity. In this particular example the rules that are applicable to chip_1 are grouped depending on the head of the rules. Same is done with the other entities. This happens in step 106 of FIG. 1. To aggregate the lift values, they are multiplied for all the rules with the same head in step 106. If this is done for the group of rules with NLE in their head, then the resulting value is referred to as prodliftNLE. Likewise, the resulting value of the group of rules with LE in the head is referred to as prodliftLE.

Steps 105 and 106 may be repeated with different groups of rules. It is possible and for statistical purposes useful to only use those rules with a lift value past a certain threshold, such as for example lift values of 1 and 1.5. If the first selected threshold was 1, then the lift values of the rules for chip_1 which were above 1 are grouped depending on their respective rule head and then multiplied. The resulting aggregated values are referred to as prodlift10NLE and prodlift10LE. If the threshold was 1.5, then only those lift values of the rules for chip_1 which were above 1.5 are grouped and multiplied. Then the resulting aggregated values are referred to as prodlift15NLE and prodlift15LE. The following table shows the result of such a computation for chip_1-chip_5.

TABLE 6

| Chip_id | ProdLiftNLE | ProdLift10NLE | ProdLift15NLE | ProdLiftLE | ProdLift10LE | ProdLift15LE | Category |
|---|---|---|---|---|---|---|---|
| chip_1 | 2.61 | 2.61 | 1.67 | 0.39 | 1 | 1 | NLE |
| chip_2 | 2.61 | 2.61 | 1.67 | 0.39 | 1 | 1 | NLE |
| chip_3 | 1.25 | 1.25 | 1.25 | 3.94 | 6.25 | 6.25 | LE |
| chip_4 | 2.61 | 2.61 | 1.67 | 0.39 | 1 | 1 | NLE |
| chip_5 | 1.25 | 1.25 | 1.25 | 3.94 | 6.25 | 6.25 | LE |

In step 107 of FIG. 1, these aggregated lift values are used as input for a classification algorithm to determine a model that is able to discriminate between the two classifications NLE and LE. In this particular example the test "prodLiftNLE>2" discriminates between the two classifications. With the set of rules and their attributes, together with the information about the entities and their aggregated lift values as well as the discrimination test, the training of the classification model is complete.

Figure 2:
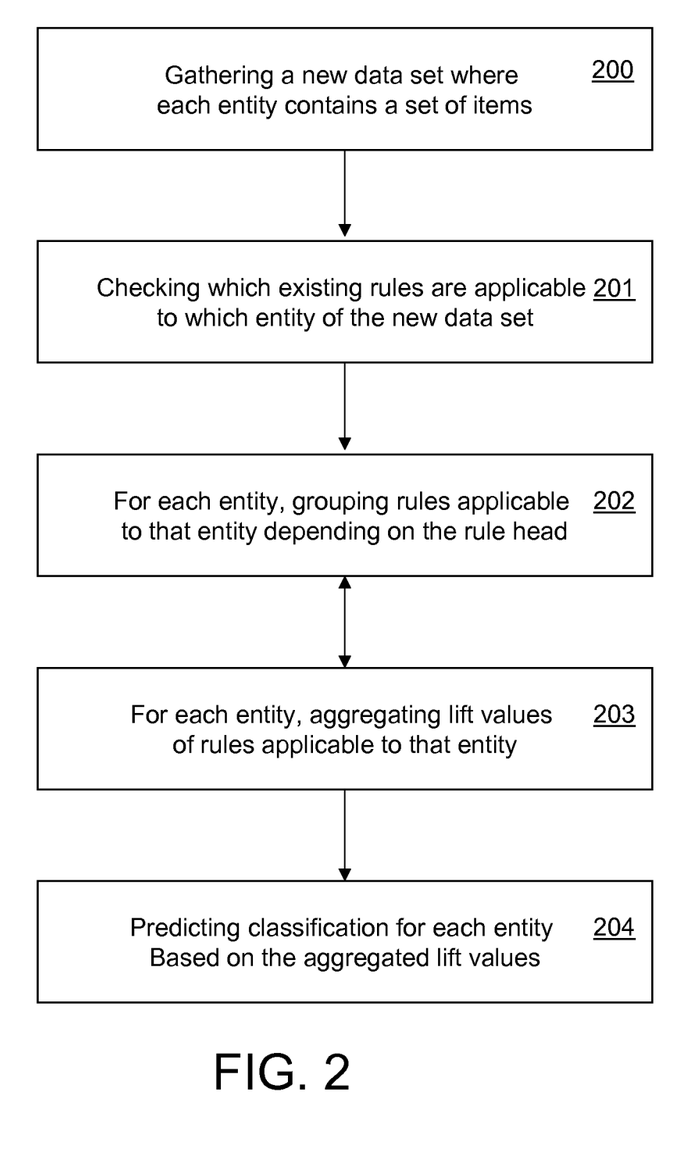
FIG. 2 shows a flow chart of using the claimed model.

Displayed in FIG. 2 is a flow chart depicting the application of the claimed model on a new dataset. Step 200 of the flow chart comprises gathering the new dataset. The new dataset comprises a set of entities (entity identifiers) and a set of items for each entity. The classification of the entities is to be accomplished by the claimed method, therefore there are no classification of the entities in the new dataset.

Referring back to the exemplary field of operation in a manufacturing process for computer chips, a new data set may look like the following table.

TABLE 7

| Entity/Chip-ID | Item/Parameter |
|---|---|
| Chip_6 | X ° C. |
| Chip_6 | Y ppm3 |
| Chip_6 | company A |
| Chip_7 | Y ° C. |
| Chip_7 | Z ppm3 |
| Chip_7 | company D |

In step 201 of FIG. 2, all existing rules are checked if they are applicable for the new data set. For example, for chip_6, each rule with X° C., Y ppm³ and company A in the rule body is applicable. Collecting the applicable rules for each entity of the new data set would result in the following table. For simplicity reasons, only the applicable rules of chip_are displayed.

TABLE 8

| Chip_id | Body | Head | Rule | lift |
|---|---|---|---|---|
| Chip_6 | X ° C. | NLE | X ° C.=>NLE | 1.25 |
| Chip_6 | X ° C. | LE | X ° C.=>LE | 0.63 |
| Chip_6 | Y ppm³ | NLE | Y ppm³=>NLE | 1.25 |
| Chip_6 | Y ppm³ | LE | Y ppm³=>LE | 0.63 |
| Chip_6 | company A | NLE | companyA=>NLE | 1.67 |

Next the lift values are aggregated for each entity. In this particular example the rules that are applicable to chip_6 are grouped depending on the head of the rules. This happens in step 202 of FIG. 2. To aggregate the lift values, they are multiplied for all the rules with the same head in step 203. If this is done for the group of rules with NLE in their head, then the resulting value is referred to as prodliftNLE. Likewise, the resulting value of the group of rules with LE in the head is referred to as prodliftLE.

Steps 202 and 203 may be repeated with different groups of rules. It is possible and for statistical purposes useful to only use those rules with a lift value past a certain threshold, such as for example lift values of 1 and 1.5. If the first selected threshold was 1, then the lift values of the rules for chip_6 which were above 1 are grouped depending on their respective rule head and then multiplied. The resulting aggregated values are referred to as prodlift10NLE and prodlift10LE. If the threshold was 1.5, then only those lift values of the rules for chip_6 which were above 1.5 are grouped and multiplied. Then the resulting aggregated values are referred to as prodlift15NLE and prodlift15LE. The following table shows the result of such a computation for chip_6.

TABLE 9

| Chip_id | ProdLiftNLE | ProdLift10NLE | ProdLift15NLE | ProdLiftLE | ProdLift10LE | ProdLift15LE | Category |
|---|---|---|---|---|---|---|---|
| chip_6 | 2.61 | 2.61 | 1.67 | 0.39 | 1 | 1 | NLE |

The thresholds for the different groups may vary depending on the application of the model. Thresholds of 1, 1.2, 1.5 and 1.8 may also be possible. Also the training method shown in FIG. 1 may contain the grouping step 202 and the multiplication step 203 similarly as the method shown in FIG. 2.

In the last step of FIG. 2, step 204, a classification is predicted based on the aggregated lift values for each entity. For the current example, the prodLift values of table 6 clearly tend towards NLE. Furthermore, the discrimination test of the classification model is applied. The discrimination test "prodLiftNLE>2" also leads to the conclusion, that chip_6 may be classified as NLE. Therefore, based on the claimed method, the chip_6 is classified as belonging to the category NLE and having no logical errors.

Figure 3:
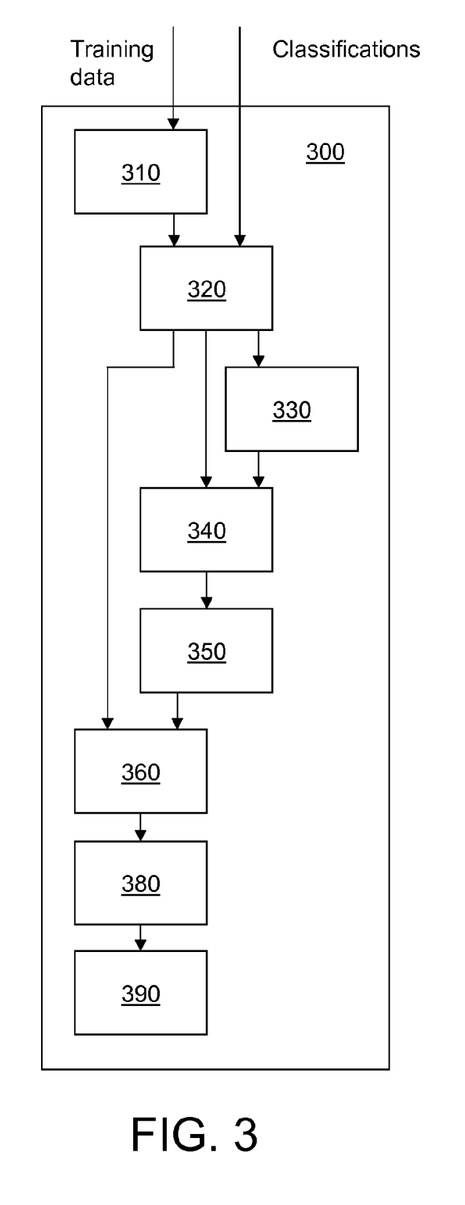
FIG. 3 shows a block diagram of a computer system for training a classification model for detecting patterns.

FIG. 3 shows, as an example, a block diagram of a computer system 300 for training a classification model for detecting patterns. The computer system 300 contains an input component 310 to retrieve a set of previously recorded input data (training data; for example as in Table 1). As discussed above, the training data contains a plurality of items associated with a plurality of entities. The computer system 300 also contains an entity classification component 320 for adding to each entity in the training data a known classification. The component 320 receives the classification information (see, for example, Table 2) as input and associates the known classification of each entity with the respective items of said entity. The output from component 320 is, for example, as shown in Table 3. The rule determining component 330 is for determining various rules based on the training data and the known classifications based on the output of the component 320.

An applicable rule determining component 340 for determining for each entity in the training data which rules are applicable. The component 340 receives as input all possible association rules and the output from the component 320. An aggregation component 350 is for aggregating, for each entity in the training data, the lift values of the rules determined for said entity in the component 340. An output component 360 outputs the resulting aggregated lift value (from the component 350) together with the respective entity and classification (from the component 320) as input for a standard classification algorithm 380. The result of the standard classification algorithm is a classification model 390.

Figure 4:
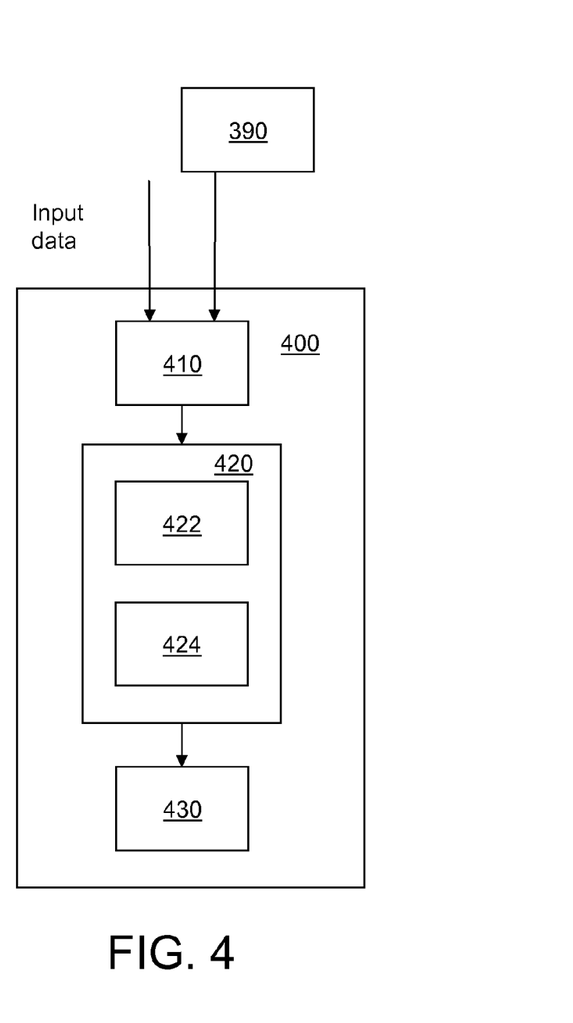
FIG. 4 shows a block diagram of a computer system for applying a classification model on input data.

FIG. 4 shows, as an example, a block diagram of a computer system 400 for applying a classification model 380 on input data. The entities of the input data are not classified and the aim is to classify them with the help of the classification model 380. A checking component 410 is for checking, for each entity in the input set, a set of rules from the classification model to determine which rules are applicable. Output from the component 410 is, for example, the input data entities and the rules applicable to each entity. An aggregation component 420 is for aggregating, for each entity, the lift values of the rules from the classification model determined for said entity. The lift values are typically calculated in the component 410 and then aggregated in the component 420. A prediction component 430 is for predicting, for each entity, a classification based on the aggregated lift value and the classification model. The aggregation component 420 may contain a grouping component 422 and a multiplication component 424. The grouping component 422 is for grouping, for each entity in the input data, the determined rules with the same classifications in the rule head. The multiplication component 424 is for multiplying with each other the lift values of the rules with the same head of each group. Also the computer system 300 for training a classification model may contain the grouping component 422 and the multiplication component 424.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the appended claims a computerized method refers to a method whose steps are performed by a computing system containing a suitable combination of one or more processors, memory means and storage means.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method for training a classification model for detecting patterns in input data, comprising:
   retrieving, using a processor of a computer, a set of input data containing a plurality of items associated with a plurality of entities;
   adding a classification to each entity of the plurality of entities;
   computing rules from the set of input data and each classification, wherein each rule associates the classification of an entity with items associated with the entity;
   for each entity,
      determining which rules are applicable; and
      aggregating lift values of the applicable rules; and
   using the aggregated lift values, the plurality of entities, and each classification to determine a classification model.

2. The method according to claim 1, wherein the aggregating further comprises:
   grouping, for each entity, the applicable rules with a same classification; and
   multiplying the lift values of the applicable rules with the same classification.

3. The method according to claim 1, wherein each rule comprises:
   a classification as a rule head;
   an item as a rule body; and
   a set of attributes including at least one of a lift value, a support value, and a confidence value.

4. A method for applying a classification model on input data, wherein the input data contains a plurality of items associated with an entity, the method comprising:
   checking, using a processor of a computer, a set of rules from the classification model to determine which rules are applicable for the entity;
   aggregating lift values of the applicable rules from the classification model; and
   predicting a classification for the entity based on the aggregated lift value and the classification model.

5. The method according to claim 4, wherein the aggregating further comprises:
   grouping the applicable rules with a same classification; and
   multiplying the lift values of the applicable rules with the same classification.

6. The method according to claim 5, wherein grouping the applicable rules further comprises:
   grouping the applicable rules whose lift values are above a predetermined threshold.

7. A computer program product for training a classification model for detecting patterns in input data, wherein the computer program product comprises:
   a computer readable storage medium having computer readable program code embodied thereon, the computer readable program code, when executed by a processor of a computer, is configured to perform:
      retrieving a set of input data containing a plurality of items associated with a plurality of entities;
      adding a classification to each entity of the plurality of entities;
      computing rules from the set of input data and each classification, wherein each rule associates the classification of an entity with items associated with the entity;
      for each entity,
         determining which rules are applicable; and
         aggregating lift values of the applicable rules; and
      using the aggregated lift values, the plurality of entities, and each classification to determine a classification model.

8. The computer program product according to claim 7, wherein, when aggregating, the computer readable program code, when executed by the processor of the computer, is configured to perform:
   grouping, for each entity, the applicable rules with a same classification; and
   multiplying the lift values of the applicable rules with the same classification.

9. The computer program product according to claim 7, wherein each rule comprises:
   a classification as a rule head;
   an item as a rule body; and
   a set of attributes including at least one of a lift value, a support value, and a confidence value.

10. A computer program product for applying a classification model on input data, wherein the input data contains a plurality of items associated with an entity, wherein the computer program product comprises:
    a computer readable storage medium having computer readable program code embodied thereon, the computer readable program code, when executed by a processor of a computer, is configured to perform:
       checking a set of rules from the classification model to determine which rules are applicable for the entity;
       aggregating lift values of the applicable rules from the classification model; and
       predicting a classification for the entity based on the aggregated lift value and the classification model.

11. The computer program product according to claim 10, wherein, when aggregating, the computer readable program code, when executed by the processor of the computer, is configured to perform:
    grouping the applicable rules with a same classification; and
    multiplying the lift values of the applicable rules with the same classification.

12. The computer program product according to claim 11, wherein, when grouping the applicable rules, the computer readable program code, when executed by the processor of the computer, is configured to perform:
   grouping the applicable rules whose lift values are above a predetermined threshold.

13. A computer system for training a classification model for detecting patterns in input data, wherein the computer system comprises:
   a processor; and
   storage for storing computer readable program code, and wherein the processor is configured to execute the computer readable program code to perform:
      retrieving a set of input data containing a plurality of items associated with a plurality of entities;
      adding a classification to each entity of the plurality of entities;
      computing rules from the set of input data and each classification, wherein each rule associates the classification of an entity with items associated with the entity;
      for each entity,
         determining which rules are applicable; and
         aggregating lift values of the applicable rules; and
      using the aggregated lift values, the plurality of entities, and each classification to determine a classification model.

14. The computer system according to claim 13, wherein, when aggregating, the processor is configured to execute the computer readable program code to perform:
   grouping, for each entity, the applicable rules with a same classification; and
   multiplying the lift values of the applicable rules with the same classification.

15. The computer system according to claim 13, wherein each rule comprises:
   a classification as a rule head;
   an item as a rule body; and
   a set of attributes including at least one of a lift value, a support value, and a confidence value.

16. A computer system for applying a classification model on input data, wherein the input data contains a plurality of items associated with an entity, wherein the computer system comprises:
   a processor; and
   storage for storing computer readable program code, and wherein the processor is configured to execute the computer readable program code to perform:
      checking a set of rules from the classification model to determine which rules are applicable for the entity;
      aggregating lift values of the applicable rules from the classification model; and
      predicting a classification for the entity based on the aggregated lift value and the classification model.

17. The computer system according to claim 16, wherein, when aggregating, the processor is configured to execute the computer readable program code to perform:
   grouping the applicable rules with a same classification; and
   multiplying the lift values of the applicable rules with the same classification.

18. The computer system according to claim 17, wherein, when grouping the applicable rules, the processor is configured to execute the computer readable program code to perform:
   grouping the applicable rules whose lift values are above a predetermined threshold.

* * * * *